United States Patent
Gounalis

(10) Patent No.: US 7,109,909 B2
(45) Date of Patent: Sep. 19, 2006

(54) SYSTEM FOR ESTABLISHING AN ATTENUATION FREQUENCY

(75) Inventor: Anthony J. Gounalis, Endicott, NY (US)

(73) Assignee: Lockheed Martin Corporation, Bethesda, MD (US)

(*) Notice: Subject to any disclaimer, the term of this patent is extended or adjusted under 35 U.S.C. 154(b) by 162 days.

(21) Appl. No.: 10/798,612

(22) Filed: Mar. 11, 2004

(65) Prior Publication Data

US 2006/0176208 A1    Aug. 10, 2006

(51) Int. Cl.
*G01S 7/36* (2006.01)
(52) U.S. Cl. .......................................... 342/13; 342/89
(58) Field of Classification Search .................. 342/13
See application file for complete search history.

(56) References Cited

U.S. PATENT DOCUMENTS

| | | | |
|---|---|---|---|
| 4,191,995 A * | 3/1980 | Farrow | ........................ 700/37 |
| 5,451,956 A | 9/1995 | Lochhead | |
| 5,534,866 A | 7/1996 | Rose | |
| 5,537,117 A | 7/1996 | Rose | |
| 5,708,443 A | 1/1998 | Rose | |
| 5,884,294 A | 3/1999 | Kadar et al. | |
| 5,914,687 A | 6/1999 | Rose | |
| 6,020,842 A | 2/2000 | Lewis et al. | |
| 6,043,771 A | 3/2000 | Clark et al. | |
| 6,163,297 A | 12/2000 | Rose | |
| 6,285,319 B1 | 9/2001 | Rose | |
| 6,313,794 B1 | 11/2001 | Rose | |
| 6,377,214 B1 | 4/2002 | Melville, II et al. | |
| 6,411,249 B1 | 6/2002 | Rose | |
| 6,545,632 B1 | 4/2003 | Lyons et al. | |
| 6,859,160 B1 * | 2/2005 | Gounalis | ...................... 342/13 |
| 2003/0095067 A1 | 5/2003 | Howell | |

FOREIGN PATENT DOCUMENTS

GB    2331371 A    5/1999

* cited by examiner

*Primary Examiner*—Thomas H. Tarcza
*Assistant Examiner*—Matthew M. Barker
(74) *Attorney, Agent, or Firm*—Tarolli, Sundheim, Covell & Tummino LLP

(57) ABSTRACT

A system in accordance with the present invention determines signal attenuation for an electronic support measure receiver. The system includes a detection module for receiving electromagnetic signals from a surrounding environment and a processing module for chronologically segregating the electromagnetic signals into a plurality of dwells. The processing module controls the processing of the plurality of dwells. The processing module determines an analysis dwell from the plurality of dwells. The processing module computes a coarse attenuation for the analysis dwell. The processing module further computes a fine attenuation from the coarse attenuation and an offset table value.

18 Claims, 5 Drawing Sheets

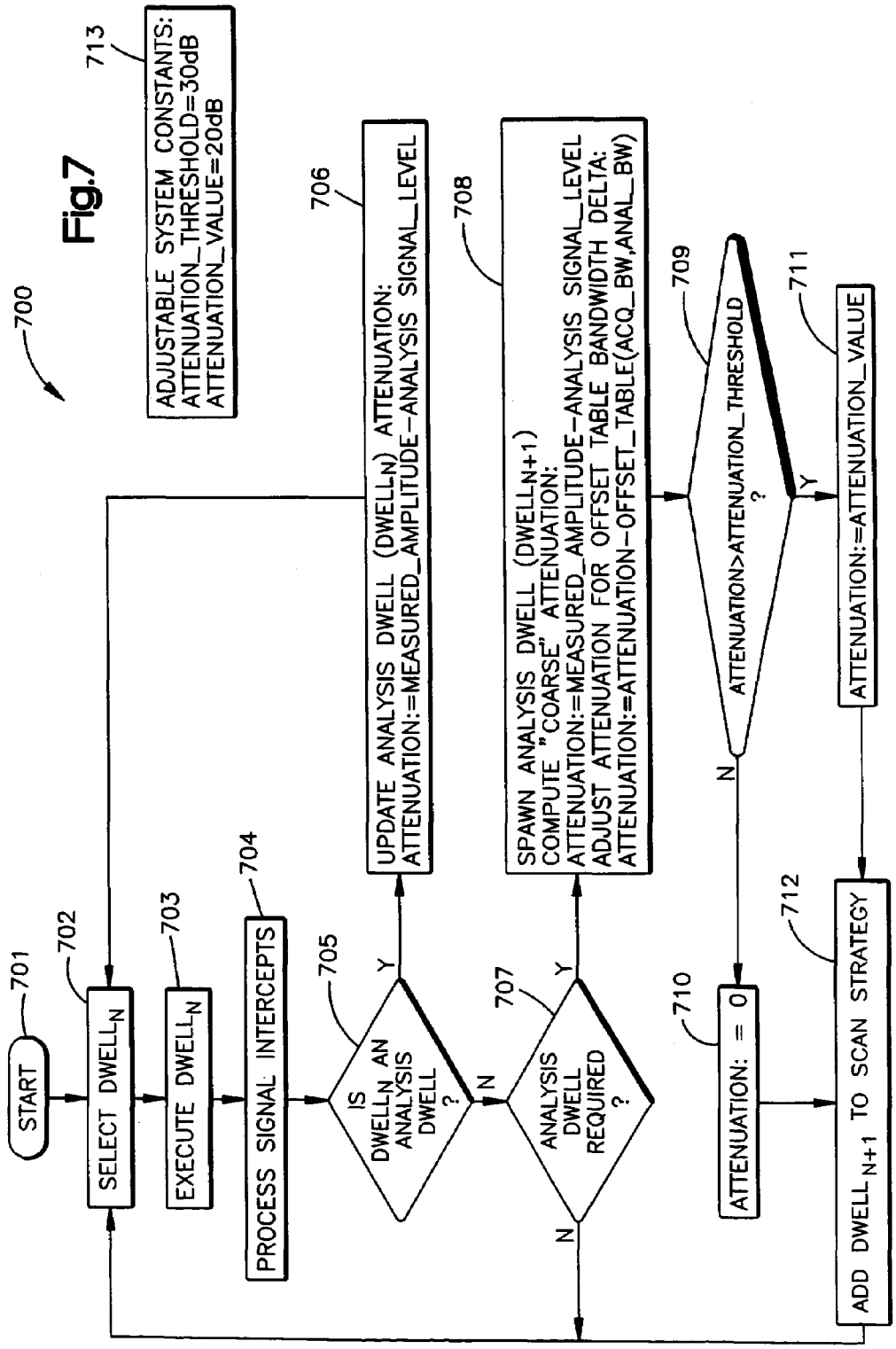

SYSTEM FOR ESTABLISHING AN ATTENUATION FREQUENCY

FEDERAL SPONSORSHIP

The U.S. Government has a paid license in this invention and the right, in limited circumstances, to require the patent owner to license others on reasonable terms as provided for by the terms of Contract No. N00019-93-C-0196 awarded by the U.S. Navy.

FIELD OF INVENTION

The present invention relates to a system for signal processing and, more specifically, a system for establishing an attenuation frequency.

BACKGROUND OF THE INVENTION

Typically, transmitted signals are collected by a receiver and processed during predetermined time intervals called dwells. The processing of signals received during a previous dwell occurs during a subsequent dwell. An inter-dwell period exists between dwells to allow for the reconfiguration of data processing circuits and other hardware in response to the processed data of the most recent dwell. Any processing of received signals or collecting of received signals is typically halted during this inter-dwell period.

There are several electronic support measure (ESM) analyses that must employ dwells to isolate emitter signals in both frequency and amplitude. These include Scan Modulation Analysis (SMA), Specific Emitter ID (SEI) and certain forms of Mode Change Detection (MCD). Typically, the emitter signals are intercepted in a wide instantaneous frequency (IF) bandwidth dwell and the analysis is performed in a narrow IF bandwidth dwell. With the switch in bandwidth comes an increase in sensitivity, requiring the prediction of the narrowband IF signal amplitude derived from the wide IF amplitude intercepted signal. ESM receivers typically perform this task by table look up, setting hardware and software detection thresholds accordingly. This works well when hardware specifications tightly control sensitivity.

However, systems that are less stringently specified typically rely on dynamic calibration to optimize sensitivity independently for each bandwidth. These systems may exhibit fluctuations in sensitivity and sensitivity deltas. In these cases, a strict table look up may over or under compensate, leading to either too much signal being detected or not detecting the signal at all (See FIG. 5).

SUMMARY OF THE INVENTION

A system in accordance with the present invention determines signal attenuation for an ESM receiver. The system includes a detection module for receiving electromagnetic signals from a surrounding environment and a processing module for chronologically segregating the electromagnetic signals into a plurality of dwells. The processing module controls the processing of the plurality of dwells. The processing module determines an analysis dwell from the plurality of dwells. The processing module computes a coarse attenuation for the analysis dwell. The processing module further computes a fine attenuation from the coarse attenuation and an offset table value.

A computer program product in accordance with the present determines signal attenuation for an ESM receiver. The computer program product includes a plurality of instructions: a first instruction for receiving electromagnetic signals from a surrounding environment; a second instruction for chronologically segregating the electromagnetic signals into a plurality of dwells; a third instruction for controlling the processing of the plurality of dwells; a fourth instruction for determining an analysis dwell from the plurality of dwells; and a fifth instruction for computing a coarse attenuation for the analysis dwell.

A method in accordance with the present invention determines signal attenuation for an ESM receiver. The method includes the steps of: receiving electromagnetic signals from a surrounding environment; chronologically segregating the electromagnetic signals into a plurality of dwells; controlling the processing of the plurality of dwells; determining an analysis dwell from the plurality of dwells; computing an update attenuation of the analysis dwell; determining whether a new analysis dwell is required; and computing a coarse attenuation of the new analysis dwell.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 7 is a schematic representation of another example system in accordance with the present invention.

DESCRIPTION OF PREFERRED EMBODIMENT

Electronic support measure (ESM) receiver systems typically are ground based, airborne, or sea based (surface or sub-surface platforms) systems that passively detect threat signals of interest, typically radar and communication signals. An ESM system identifies, classifies, and prioritizes detected signals for display to an operator or crew. The goal is to provide the crew with a tactical picture, or "situational awareness", of the electromagnetic environment around them, such that the crew may react and counter any threats (e.g., maneuver, apply counter measure, attack, etc.). Since signal detection is passive (only receiving), an ESM receiver cannot be detected (i.e., an operator of a threat does not know that the ESM is in operation or that the threat has been detected, identified, and possibly located, etc.).

Figure 1:
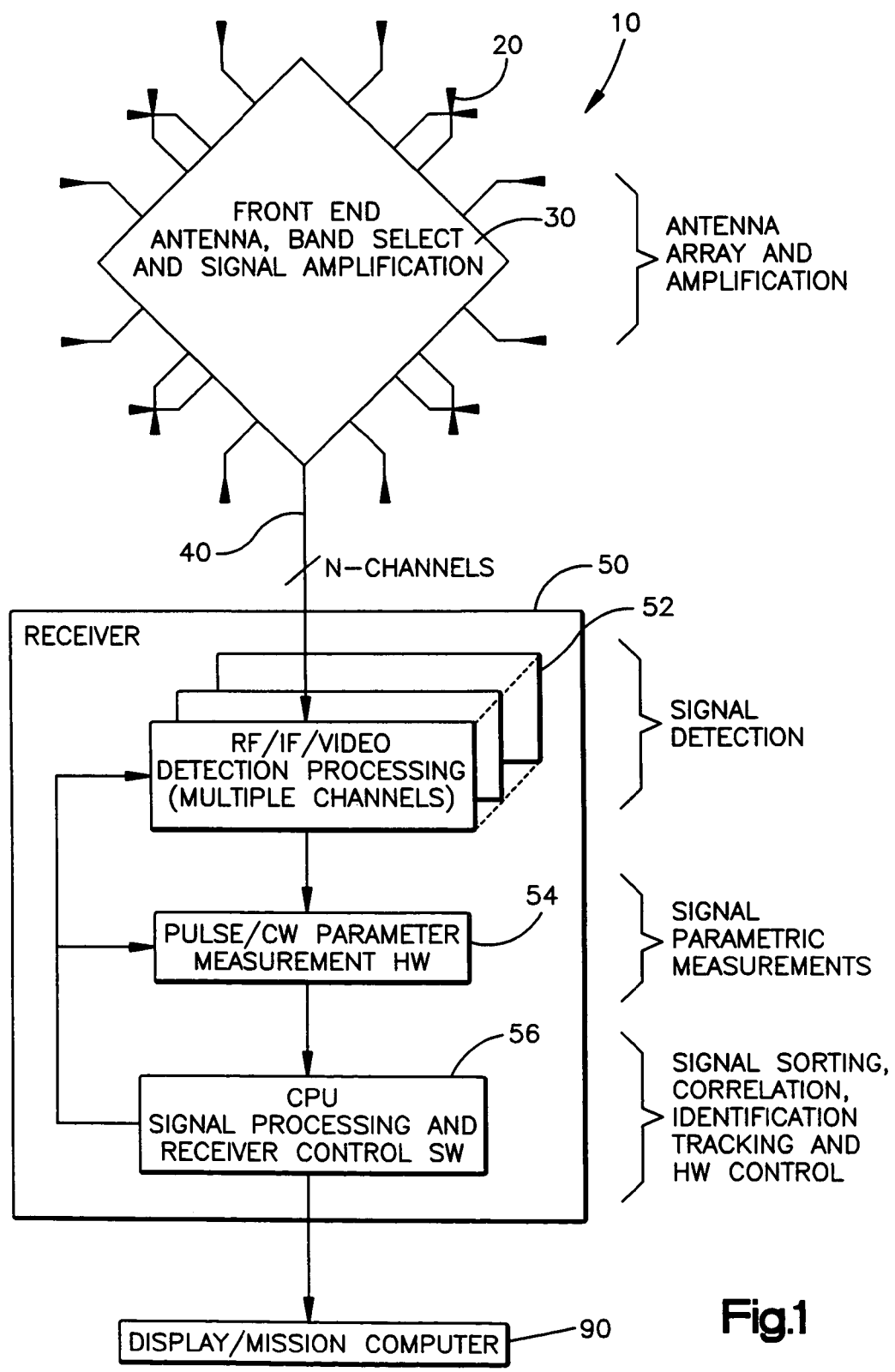
FIG. 1 is a schematic representation of an example system for use with the present invention.

Although there are many variations, a typical ESM receiver system 10, as seen in FIG. 1, consists of an antenna array 20, low noise preamplifier 30, antenna cables 40, a receiver 50, and display 90. The antenna array 20 is arranged to provide a 360 degree field of view and direction of arrival information. In some applications, a rotating "dish" antenna may be used.

The receiver 50 may typically be a super-heterodyne receiver with one or more channels switched among the antenna array inputs. The receiver 50 may include a detection module 52 and a signal parametric measurement module 54 (i.e., angle of arrival, frequency, modulation, amplitude, etc.). The receiver 50 may also include one or more CPUs 56 that are tasked with running software for controlling how the electromagnetic environment is scanned for signal detection and for identifying, prioritizing, and tracking detected signals. Signal detection, or "emitter reports", are then provided directly to the display 90 or are reported to a computer for post-processing and further display.

Some applications of ESM receivers may include self-protection, surveillance, and strike package support. Self-protection receivers are typically referred to as Radar Warning Receivers (RWR). The goal of RWR systems is to detect radar signals that control weapons and may harm a vehicle and crew. RWR's require very rapid detection times to allow the crew as much time as possible to counter or evade a threat.

Surveillance receivers provide a tactical picture of the electromagnetic environment. The goal is to determine the classification, bearing, and location of all signals within a region of interest. This may include passive tracking of commercial shipping, or the passive detection and location of hostile submarines. Electronic Intelligence (ELINT) collection is a somewhat more dangerous variation of surveillance.

For strike package support, enemy air defenses may be countered with airborne jammers, which react and focus the jammer power at the signals detected by the ESM receiver. This "Electronic Attack" degrades performance of the detected defenses such that strike aircraft may complete their mission and return safely.

As stated above, software is responsible for detecting, identifying, and reporting signals, as well as for controlling the scan of the electromagnetic environment. Scanning the environment requires that the receiver hardware be periodically commanded to "look" in the appropriate frequency band(s) for a period of time consistent with the signal of interest characteristics expected within the band. This is referred to as a "dwell". There may be one or more dwells, depending on the application and signal of interest characteristics. For example, the RWR function typically looks for a limited set of signals, and can often be configured to "stare" in a particular frequency band.

In contrast, the surveillance function may require a broad frequency range to be scanned, requiring many dwells with different dwell characteristics to satisfy a diverse set of signal parameters. Regardless of application, dwells can be broadly assigned as belonging to one of two categories: Acquisition Dwells or Analysis Dwells. The primary purpose of Acquisition Dwells is to scan the frequency range of interest to acquire and characterize new signals within a designated response time period and maintain track of these signals. In order to facilitate rapid acquisition, the amount of characterization data may be limited, such that ambiguities with respect to unique emitter identification or emitter operating mode may exist. When ESM software recognizes these conditions, Analysis Dwells may be created, or "spawned", to collect specific information to resolve these identification and mode ambiguities. Although this is a typical need of Analysis Dwells, it is not the only need. An Analysis Dwell may be spawned to collect any tailored class of emitter data that is not normally or readily available during Acquisition, but is required to successfully complete the ESM mission. Analysis Dwells may also be spawned in response to an operator request for additional emitter data.

Figure 2:
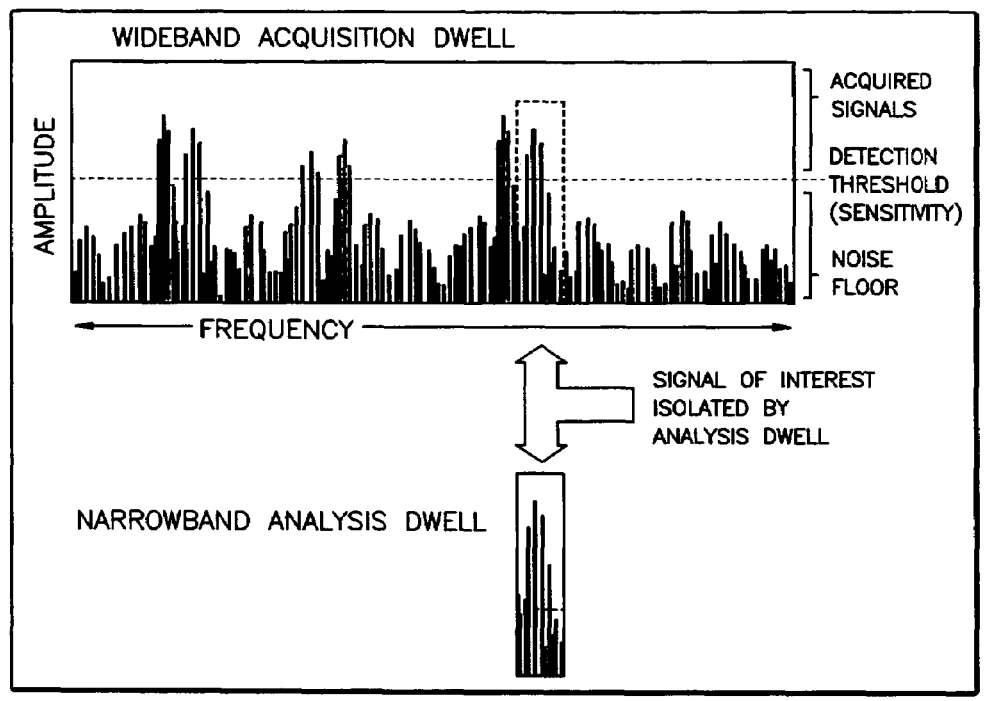
FIG. 2 is a schematic representation of an example system for use with the present invention.

One characteristic of Analysis Dwells is that they are matched to the signal of interest, while Acquisition Dwells are optimized to an expected set of signals. The intent of matching the dwell to the signal is to isolate the desired signal for analysis as much as possible in time, frequency and amplitude from other environmental signals. This matching may thus reject interference from "adjacent" signals and maximize the quality of Analysis Dwell measurements. This requires the ESM software to spawn the Analysis Dwell that best isolates a signal based on the parametric measurements made in the Acquisition Dwell (FIG. 2).

Acquisition Dwell bandwidth typically is wider than Analysis Dwell bandwidth. Analysis Dwell bandwidth is typically the minimum bandwidth available to the ESM system that still accommodates the signal's bandwidth, as estimated from the Acquisition Dwell data. This helps isolate the signal of interest from the adjacent signals. Therefore, an Analysis Dwell may be narrowband with respect to its corresponding Acquisition Dwell.

Figure 3:
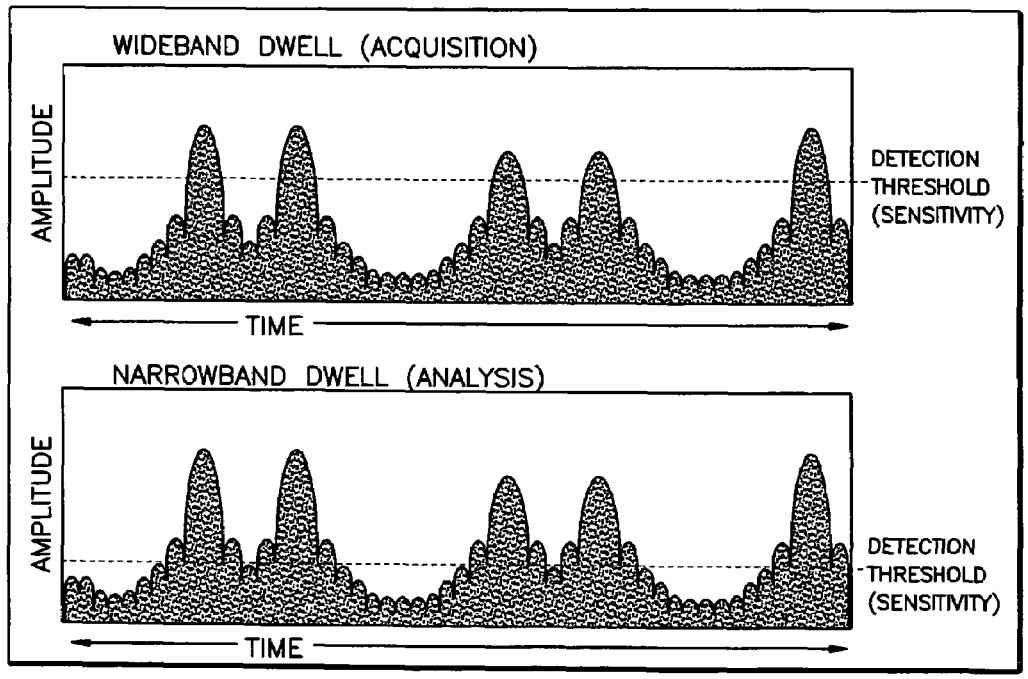
FIG. 3 is a schematic representation of an example system for use with the present invention.

The physics of the ESM receiver, whether implemented with digital or analog technology, is that the bandwidth difference between wideband Acquisition Dwells and narrowband Analysis Dwells results in a sensitivity difference between the two dwell types (See FIG. 3). Also, as a practical matter, an instantaneous dynamic range of a receiver is fixed, such that an increase in sensitivity may allow signal amplitude to exceed the instantaneous dynamic range, possibly resulting in poor parametric measurements or spurious signal generation. This condition may be exacerbated if an analog wideband acquisition channel is used to cue a digital analysis channel, since a dynamic range of a digital analysis channel may typically be significantly less than an analog analysis channel.

In addition to the possibility of running out of dynamic range, additional narrowband sensitivity may allow detection of unnecessary low power signal sidelobes (See FIG. 3). For many analyses, only a mainbeam signal is of interest, such that sidelobe intercepts provide no additional information and are discarded. Further, the loss of coherency in the sidelobes may be detrimental to an analysis if not successfully rejected (e.g., Doppler processing).

Increased sensitivity of narrowband Analysis Dwells is not always desirable, and may be detrimental. A system in accordance with the present invention may translate and predict amplitude measurements made in a wideband Acquisition Dwell to a narrowband Analysis Dwell and determine the amount of desensitization necessary for 1) maintaining a signal within a system dynamic range and 2) collecting signal data at an optimal or near optimal amplitude level.

Figure 4:
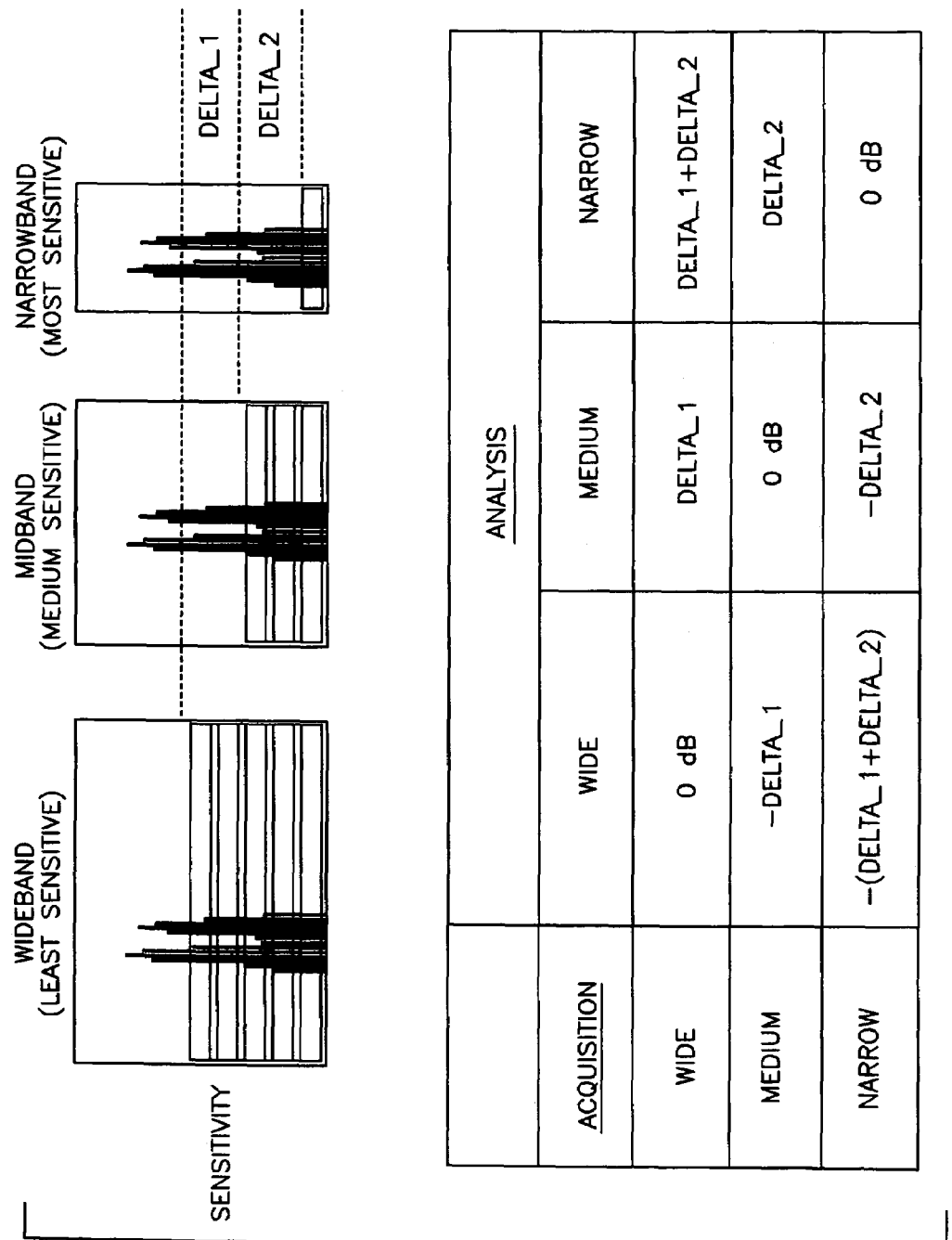
FIG. 4 is a schematic representation of an example system for use with the present invention.

A conventional technique relies on lookup tables that contain a sensitivity offset between all possible bandwidth combinations (See FIG. 4). This technique includes empirical analysis of several receivers to establish table values. The technique further implements specifications and manufacturing procedures such that future receivers match table values with low unit-to-unit variance. This technique operates satisfactorily, but is expensive and may not account for unit aging and temperature extremes accurately. Also, a lesser side effect is that Attenuation often needs to be set when a dwell is created with dwell sensitivity calibration data not yet available to adjust the lookup table.

This technique is further costly as software calibration algorithms are put in place to maximize sensitivity for each Analysis Dwell individually. The sensitivity offsets are no longer fixed values, but now vary dynamically. This makes sense from the Acquisition Dwell point of view, but does not necessarily benefit the Analysis Dwell. Acquisition Dwells may be known a priori and may be calibrated at system start up, then periodically, at a low duty cycle rate. Conversely, Analysis Dwells do not exist prior to signal detection, and therefore would require "on demand" calibration that in many situations may require an unacceptably long duration. Also, having the calibration routines optimize sensitivity with respect to a desired signal is not robust, since, in the ESM case, the signal of interest is, in general, not cooperative (e.g., hostile threat radar). Another alternative, to "pre-calibrate" the offset tables for all potentially expected Analysis Dwell configurations, is prohibitive in terms of receiver storage space, receiver workload, and potential offset table size.

Figure 5:
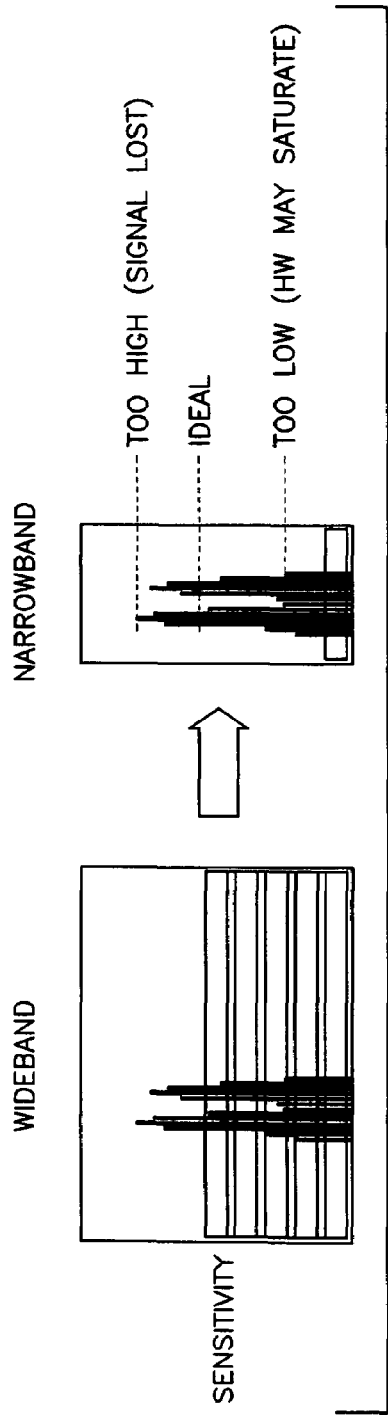
FIG. 5 is a schematic representation of an example system for use with the present invention.

A significant manufacturing cost reduction may be realized if tightly controlled receiver specifications and manufacturing tolerances may be relaxed with respect to sensitivity offset table values. However, simply relaxing tolerance controls is not sufficient, since offset table use may then over-compensate or under-compensate, leading to either too much signal being detected or no signal being detected (See FIG. 5). A system in accordance with the present invention achieves optimal Analysis Dwell performance while enjoying the cost benefits of relaxed tolerances.

The system determines whether an Analysis Dwell is required and initializes dwell parameters accordingly. The system further accesses a sensitivity offset table based on Acquisition Dwell signal amplitude measurements. The sensitivity offset table determines the nominal, or "coarse", sensitivity offset between an Acquisition Dwell and its corresponding Analysis Dwell. Although each analysis type is unique, each requires a certain amount of signal power. This parameter may be termed Analysis_Signal_Level. The system determines the difference between a measured amplitude and Analysis_Signal_Level. This is an amount of "extra" signal that may be discarded. The system may add the sensitivity offset table lookup value to this signal. This may be an amount of attenuation that an Analysis Dwell should impose to maintain a signal within an instantaneous dynamic range and still retain a minimum analysis signal amplitude for signal analysis.

Since a sensitivity offset table value provides only a coarse estimate, the computed amount of attenuation may be incorrect. If the magnitude of this coarse error may be approximated, the system may determine whether to impose a nominal attenuation value based on the magnitude of the coarse estimate. The system may compare Attenuation to a predetermined Attenuation_Threshold. If the Attenuation is greater than the Attenuation_Threshold, then Attenuation is set to a nominal value, Attenuation_Value. Otherwise, Attenuation is set to zero.

Attenuation_Threshold and Attenuation_Value may be selected to ensure that the Analysis Dwell signal will be within a receiver dynamic range and above the threshold, but with more sensitivity than Analysis_Signal_Level may optimally demand. However, once the Analysis Dwell starts intercepting the signal, which is now within the receiver's operating amplitude range, attenuation may be "fine tuned" directly using the Analysis Dwell amplitude measurements. Since data is now being provided by the Analysis Dwell, attenuation may be re-computed by subtracting the Analysis Dwell amplitude data from the Analysis_Signal_Level, thereby optimizing the Analysis Dwell attenuation to best analyze the signal (See FIG. 6).

A system in accordance with the present invention provides more tolerance to unit-to-unit manufacturing variances. Further, the system is more compatible with bandwidth controlled dynamic sensitivity optimization. The cost associated with receiver characterization to establish lookup table values is also reduced.

An example system 700 in accordance with the present invention initializes and sets a scan strategy in step 701. Following step 701, the system 700 proceeds to step 702. In step 702, the system 700 selects a Dwell N, where N is a positive integer greater than of equal to 1. Following step 702, the system 700 proceeds to step 703. In step 703, the system 700 executes Dwell N. Following step 703, the system 700 proceeds to step 704. In step 704, the system 700 processes intercept signals. Following step 704, the system 700 proceeds to step 705. In step 705, the system 700 determines whether Dwell N is an analysis dwell.

If Dwell N is an analysis dwell, the system 700 proceeds to step 706. In step 706, the system 700 updates the attenuation of Dwell N for analysis. Further, the system 700 sets Attenuation of Dwell N to the measured amplitude, Measured_Amplitude minus a predetermined analysis signal level, Analysis_Signal_Level. Following step 706, the system 700 proceeds back to step 702.

In step 705, if Dwell N is not an analysis dwell, the system 700 proceeds to step 707. In step 707, the system 700 determines whether an analysis dwell is required. If an analysis dwell is not required, the system 700 proceeds back to step 702.

In step 707, if an analysis dwell is required, the system 700 proceeds to step 708. In step 708, the system 700 spawns an analysis dwell, Dwell N+1. The system 700 computes a coarse Attenuation to be Measured_Amplitude minus Analysis_Signal_Level. In step 708, the system 700 further adjusts Attenuation by means of an offset table bandwidth delta by setting Attenuation to be Attenuation minus the offset table bandwidth delta, Offset_Table(Acq_BW, Anal_BW). Following step 708, the system 700 proceeds to step 709. In step 709, the system 700 determines whether Attenuation is greater than a predetermined attenuation threshold, Attenuation_Threshold. If Attenuation is not greater than Attenuation_Threshold, the system 700 proceeds to step 710. In step 710, the system 700 sets Attenuation to 0. Following step 710, the system 700 proceeds to step 712.

In step 709, if Attenuation is greater than Attenuation_Threshold, the system 700 proceeds to step 711. In step 711, the system 700 sets Attenuation to the value of attenuation, Attenuation_Value. Following step 711, the system 700 proceeds to step 712.

In step 712, the system 700 adds Dwell N+1 to the scan strategy. Following step 712, the system 700 proceeds back to step 702. Box 713 of FIG. 7 provides example constants for the system 700.

Figure 6:
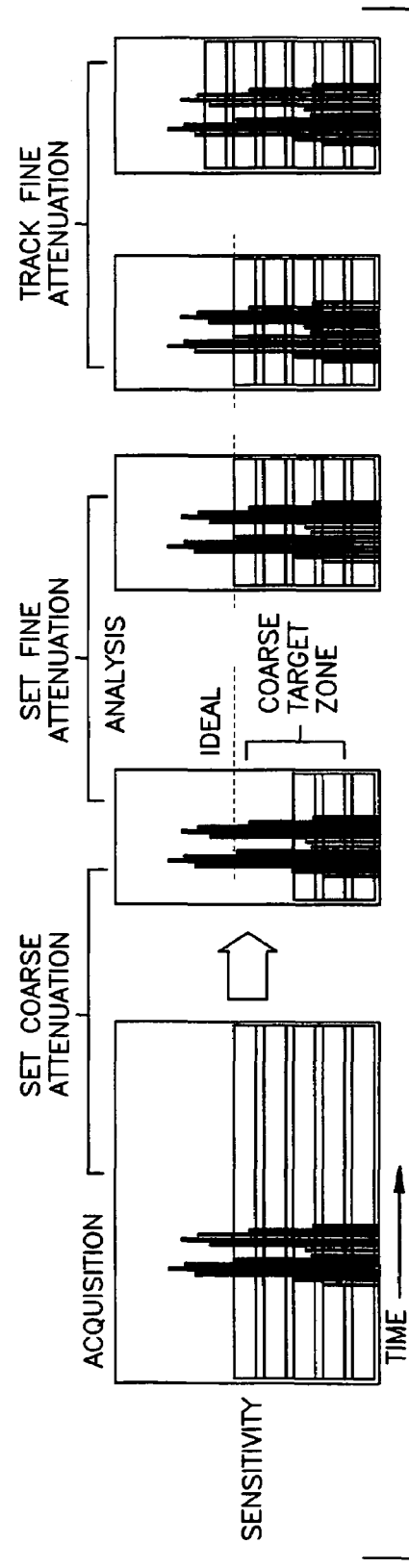
FIG. 6 is a schematic representation of an example system in accordance with the present invention.

An example system 700 in accordance with the present invention determines an attenuation frequency for an electromagnetic signal receiver 50. The system 700 includes a detection module 52 for receiving electromagnetic signals from a surrounding environment and a processing module 56 for chronologically segregating the electromagnetic signals into a plurality of dwells. The processing module 56 controls the processing of the plurality of dwells. The processing module 56 determines 705 an analysis dwell from the plurality of dwells. The processing module 56 computes 708 a coarse attenuation for the analysis dwell (FIG. 6). The processing module 56 further computes 708 a fine attenuation from the coarse attenuation and an offset table value (FIG. 6).

An example computer program product 700 in accordance with the present determines an attenuation frequency for an electromagnetic signal receiver 50. The computer program product 700 includes a plurality of instructions: a first instruction for receiving electromagnetic signals from a surrounding environment; a second instruction for chronologically segregating the electromagnetic signals into a plurality of dwells; a third instruction for controlling 703 the processing of the plurality of dwells; a fourth instruction for determining 705 an analysis dwell from the plurality of dwells; and a fifth instruction for computing 708 a coarse attenuation for the analysis dwell.

An example method 700 in accordance with the present invention determines an attenuation frequency for an electromagnetic signal receiver 50. The method 700 includes the steps of: receiving electromagnetic signals from a surrounding environment; chronologically segregating the electromagnetic signals into a plurality of dwells; controlling 703 the processing of the plurality of dwells; determining 705 an analysis dwell from the plurality of dwells; computing 708 a coarse attenuation for the analysis dwell; determining 707 whether a new analysis dwell is required; and spawning 708 a new analysis dwell.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

I claim:

1. A system for determining signal attenuation for an electronic support measure receiver, said system comprising:
    a detection module for receiving electromagnetic signals from a surrounding environment;
    a processing module for chronologically segregating the electromagnetic signals into a plurality of dwells, said processing module controlling the processing of said plurality of dwells,
    said processing module determining an analysis dwell from said plurality of dwells, said processing module computing a coarse attenuation for the analysis dwell, said processing module further computing a fine attenuation from the coarse attenuation and an offset table value.

2. The system as set forth in claim 1 wherein said processing module computes the fine attenuation by subtracting the offset table value from the coarse attenuation.

3. The system as set forth in claim 2 wherein said processing module determines whether the fine attenuation is greater than an attenuation threshold.

4. The system as set forth in claim 3 wherein said processing module sets the fine attenuation to zero.

5. The system as set forth in claim 3 wherein said processing module sets the fine attenuation to a predetermined attenuation value.

6. The system as set forth in claim 1 wherein said processing module determines whether a new analysis dwell in required.

7. The system as set forth in claim 1 wherein said processing module spawns a new analysis dwell.

8. The system as set forth in claim 1 wherein said processing module executes the analysis dwell.

9. The system as set forth in claim 1 wherein the coarse attenuation equals a measured signal amplitude minus a predetermined analysis signal level.

10. The system as set forth in claim 1 wherein said processing module determines whether one of said plurality of dwells is an analysis dwell.

11. A computer program product on a computer-readable medium for determining signal attenuation for an electronic support measure receiver, said computer program product comprising:
    a first instruction for receiving electromagnetic signals from a surrounding environment;
    a second instruction for chronologically segregating the electromagnetic signals into a plurality of dwells;
    a third instruction for controlling the processing of the plurality of dwells;
    a fourth instruction for determining an analysis dwell from the plurality of dwells;
    a fifth instruction for computing a coarse attenuation for the analysis dwell; and
    a sixth instruction for computing a fine attenuation from the coarse attenuation and an offset table value.

12. The computer program product as set forth in claim 11 further including a seventh instruction for determining whether the fine attenuation is greater than an attenuation threshold.

13. The computer program product as set forth in claim 11 further including a seventh instruction for setting the fine attenuation to zero.

14. The computer program product as set forth in claim 11 further including a seventh instruction for setting the attenuation to a predetermined attenuation value.

15. A method for determining signal attenuation for an electronic support measure receiver, said method comprising the steps of:
    receiving electromagnetic signals from a surrounding environment;
    chronologically segregating the electromagnetic signals into a plurality of dwells;
    controlling the processing of the plurality of dwells;
    determining an analysis dwell from the plurality of dwells;
    computing an update attenuation of the analysis dwell;
    determining whether a new analysis dwell is required;
    computing a coarse attenuation of the new analysis dwell; and
    computing a fine attenuation from the coarse attenuation and an offset table value.

16. The method as set forth in claim 15 further including the step of executing the analysis dwell.

17. The method as set forth in claim 15 further including the step of computing the coarse attenuation by subtracting a predetermined analysis signal level from a measured signal amplitude.

18. The method as set forth in claim 15 further including the step of determining whether one of the plurality of dwells is an analysis dwell.

* * * * *